(12) United States Patent
Takizawa et al.

(10) Patent No.: US 6,540,364 B2
(45) Date of Patent: Apr. 1, 2003

(54) PROJECTOR

(75) Inventors: Takeshi Takizawa, Shiojiri (JP); Shinsuke Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/878,253

(22) Filed: Jun. 12, 2001

(65) Prior Publication Data

US 2002/0027643 A1 Mar. 7, 2002

(30) Foreign Application Priority Data

Jun. 12, 2000 (JP) ........................................ 2000-175855

(51) Int. Cl.⁷ ........................... G03B 21/16; G03B 21/18
(52) U.S. Cl. ........................................... 353/61; 353/52
(58) Field of Search ................................ 353/57, 58, 61

(56) References Cited

U.S. PATENT DOCUMENTS

| 2,344,263 | A | * | 3/1944 | Perkins | 353/104 |
| 6,040,877 | A | * | 3/2000 | Won | 348/748 |
| 6,254,238 | B1 | * | 7/2001 | Takamatsu | 353/61 |
| 6,280,038 | B1 | * | 8/2001 | Fuse et al. | 353/57 |
| 6,290,360 | B1 | * | 9/2001 | Konuma et al. | 353/58 |
| 6,334,686 | B1 | * | 1/2002 | Shiraishi et al. | 353/119 |
| 6,398,366 | B1 | * | 6/2002 | Hara et al. | 353/57 |

FOREIGN PATENT DOCUMENTS

JP        A 8-304739        11/1996

* cited by examiner

Primary Examiner—Russell Adams
Assistant Examiner—D. Ben Esplin
(74) Attorney, Agent, or Firm—Oliff & Berridge, PLC

(57) ABSTRACT

The invention provides a projector capable of reducing costs and promoting miniaturization while also being dust-proof. A second sirocco fan with an air-inlet opposing a projection lens is used, and an air-inlet of an outer case is formed on a side face thereof. Thereby, it is difficult for dust to be sucked therein compared with an air-inlet formed on the bottom or top face of the outer case, enabling the projector to be dust-proof without any filter. Since the filter is not required, the number of parts is reduced, thereby reducing costs. Furthermore, the second sirocco fan is placed by utilizing a space under the projection lens, which is liable to be a dead space, enabling the arrangement space to be efficiently used thereby promoting miniaturization of a projector.

7 Claims, 11 Drawing Sheets

PROJECTOR

BACKGROUND OF THE INVENTION

1. Field of Invention

The present invention relates to a projector for forming a projected image by magnifying and projecting luminous flux emitted from a light source via a projection lens after being modulated.

2. Description of Related Art

Recently, the number of environments in which projectors are used has increased, and apart from being used solely for presentations in office meetings or meetings on business trips, projectors are now being used at technical meetings in research and development divisions, etc., for capturing CAD/CAM/CAE data therein in order to magnify and project the data, or at various seminars and learning courses. Projectors are now also being used in school classes where audiovisual education is carried out. The projectors are also used for studying therapeutic methods and for performing medical guidance by projecting medical images and data, such as CT scans and MRI, and they are also used for efficiently addressing attendees at exhibitions or conventions in which a number of people are gathered.

Presently, because projectors are used in various environments, various requirements for the specifications and functions of projectors exist, such as light-weight compact models enhancing portability, high-luminance and high-resolution models enhancing image quality, and value-added models capable of connecting to various digital equipment and mobile tools.

Since further increases in the number of environments in which the projectors will be used is likely, more advanced value-added projectors are being vigorously developed based upon the new environments in which projectors will be used.

In such environments, techniques for protecting the inside of the projector from contamination are under development. It is particularly necessary to protect the various optical elements inside the projector from dust in order to maintain excellent image quality. Therefore, a dust-proof method of using cooling air for cooling these elements is important.

An axial-flow fan used as a cooling fan must be arranged close to the internal elements that need to be cooled, resulting in frequent limitations of the arrangement within the projector. Therefore, the problem arises that the degree of freedom of the design layout of the internal parts, including the fan, is so small that it prevents projector miniaturization.

In a conventional projector, an air-inlet is typically arranged on the bottom face or the top face of an outer case. Accordingly, dust at the set-up position of the projector may be sucked from the bottom face, or dust on the top face may be readily sucked therein. As air is received from the bottom face or the top face by using the axial-flow fan, an airflow resistance accompanied by air receiving is also liable to be generated. Therefore, a comparatively large clearance between the body and the set-up surface needs to be maintained with foot members, etc. Thus, the problem also arises of preventing the apparatus height from being reduced and furthermore preventing projector miniaturization.

SUMMARY OF THE INVENTION

It is an object of the present invention to provide a projector capable of reducing costs and promoting miniaturization while making sure that the projector is dust-proof.

A projector according to the present invention includes: a light source; a projection lens; an outer case having an air-inlet formed on the side thereof that receives cooling air, the air-inlet being disposed beside the projection lens; and a sirocco fan that receives air disposed at one of an upper part and a lower part of the projection lens. Luminous flux emitted from the light source is magnified and projected by the projection lens so as to form a projected image after being modulated. An air-inlet of the sirocco fan opposes the projection lens.

In the structure according to the present invention, since the air-inlet is formed on the side of the outer case, the possibility of sucking dust on the set-up place of the projector is reduced, and it is difficult for dust to stick to the periphery of the air-inlet, which enables the projector to be dust-proof without requiring a filter on the air-inlet. Even when a filter is attached thereto, it is difficult for dust to stick to the periphery of the air-inlet, which enables the number of replacements of the filter to be reduced. Under certain circumstances, the replacement of the filter can be eliminated. If so, the replacement structure of the filter is not required.

When the filter or the replacement structure of the filter is not required, the number of parts is reduced, and the structure around the air-inlet can also be simplified, thereby reducing the manufacturing cost.

Since the air-inlet is formed on the side face of the outer case, and the air-inlet of the sirocco fan opposes the projection lens, the air-flow resistance following air receiving can be reduced, which facilitates miniaturization of the apparatus.

Furthermore, the sirocco fan is placed by utilizing a space in an upper part or a lower part of the projection lens which is liable to be a dead space, enabling the internal space to be efficiently used and the degree of freedom of a layout design for other internal elements to be increased, thereby promoting miniaturization of the projector.

In a projector according to the present invention, a duct in the receiving side may be preferably arranged between the air-inlet formed on the side of the outer case and the air-inlet of the sirocco fan. By arranging the duct in the receiving side, the cooling air flows into the air-inlet of the sirocco fan efficiently so as to improve the cooling efficiency of the internal elements.

In a projector according to the present invention, a duct in the exhaust side may be preferably arranged between an air-outlet of the sirocco fan and one of an upper part and a lower part of an optical modulator that modulates the luminous flux. By arranging the duct in the exhaust side, the cooling air can be securely sent without omission to the optical modulator from the air-outlet of the sirocco fan, enabling the cooling efficiency to be further enhanced.

In a projector according to the present invention, a duct in the exhaust side may be preferably arranged between an air-outlet of the sirocco fan and one of an upper part and a lower part of an optical modulator that modulates the luminous flux, and the duct in the receiving side and the duct in the exhaust side may preferably be formed integrally with each other. By such a structure, in addition to the enhancement of the cooling efficiency, the handling of the duct is enhanced due to the integration, facilitating assembly of the duct into the projector.

In a projector according to the present invention, the duct in the exhaust side may preferably be provided with a direction-bending section formed therein that vertically bends the direction of the cooling air delivered from the sirocco fan.

By providing the direction-bending section, the air-flow direction can be vertically bent securely, so that the optical modulator can be more sufficiently cooled.

The direction-bending section may be preferably formed to have a smooth curved shape. This structure enables the cooling air to flow smoothly so as to suppress noises, etc.

Furthermore, any one of the ducts may preferably be provided with a recess formed therein which is adjacent to and opposes the peripheral surface of the projection lens.

Since the projection lens is generally cylindrical, even when the sirocco fan is arranged to be adjacent to the peripheral face of the projection lens, a clearance is created between the sirocco fan and the projection lens. When the duct is provided with the recess having a shape corresponding to that of such a clearance so as to be adjacent to and oppose the projection lens, a space in the vicinity of the air-inlet of the sirocco fan can be certainly secured as a space within the duct, so that the cooling air flows into the air-inlet of the sirocco fan smoothly.

DETAILED DESCRIPTION OF PREFERRED EMBODIMENTS

An embodiment according to the present invention will be described below with reference to the drawings.

[1. Principal Structure of Projector]

Figure 1:
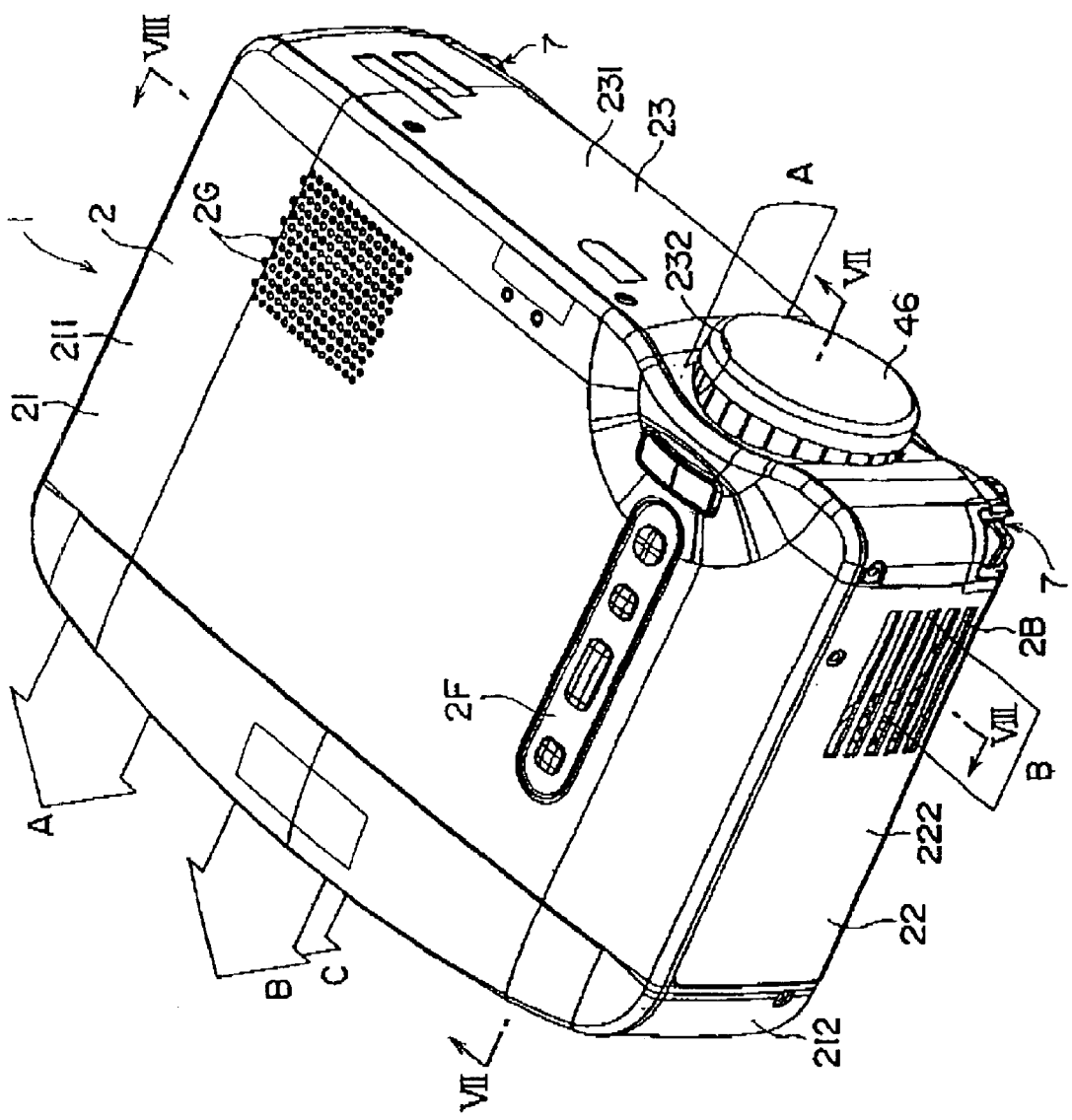
FIG. 1 is an entire perspective view of a projector according to an embodiment of the present invention viewed from the top.
Figure 2:
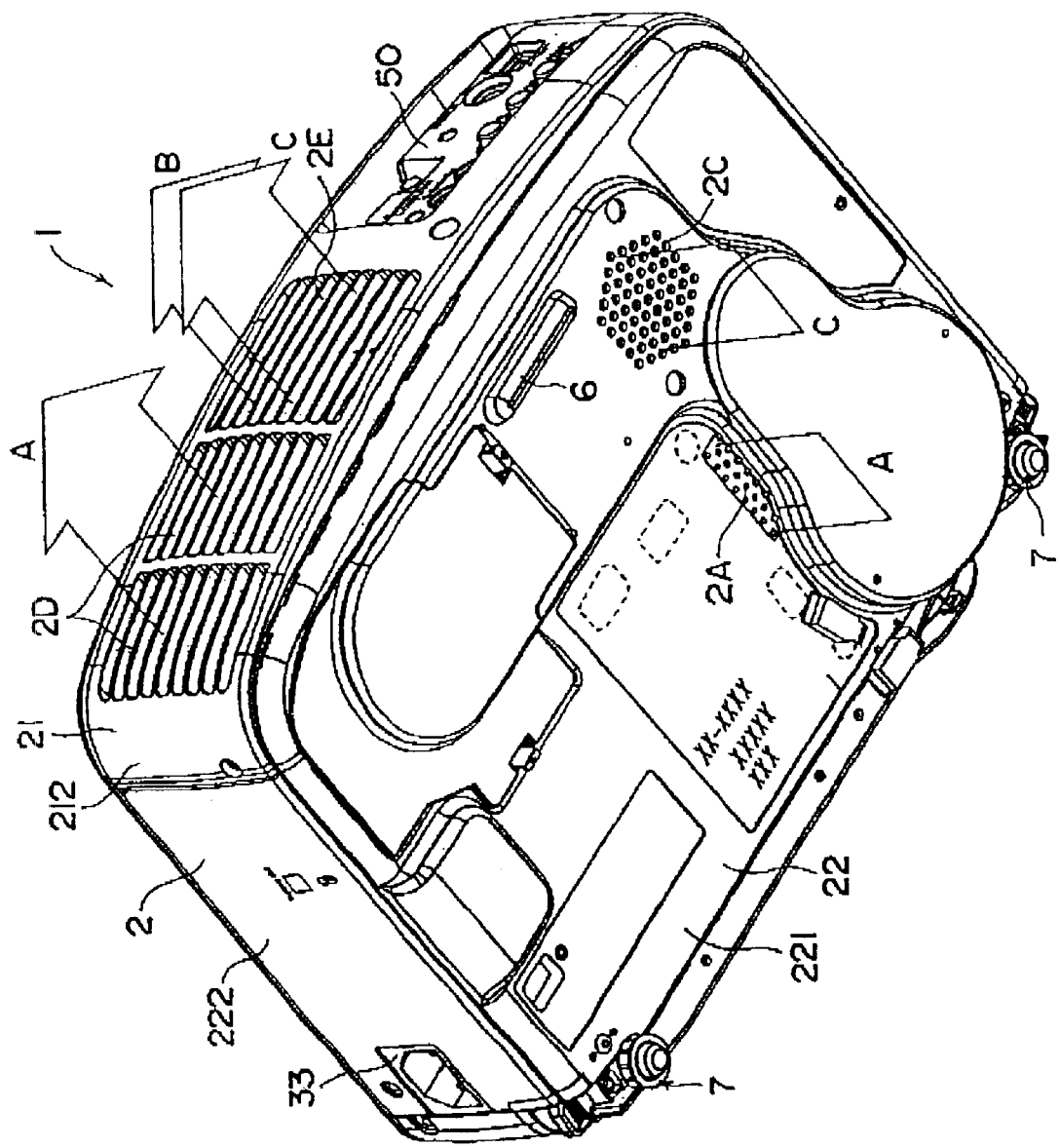
FIG. 2 is an entire perspective view of the projector viewed from the bottom.

FIG. 1 is an entire perspective view of a projector 1 according to an embodiment of the present invention viewed from the top; FIG. 2 is an entire perspective view of the projector 1 viewed from the bottom; and FIG. 3 is a perspective view of the projector 1 showing the inside thereof.

Figure 3:
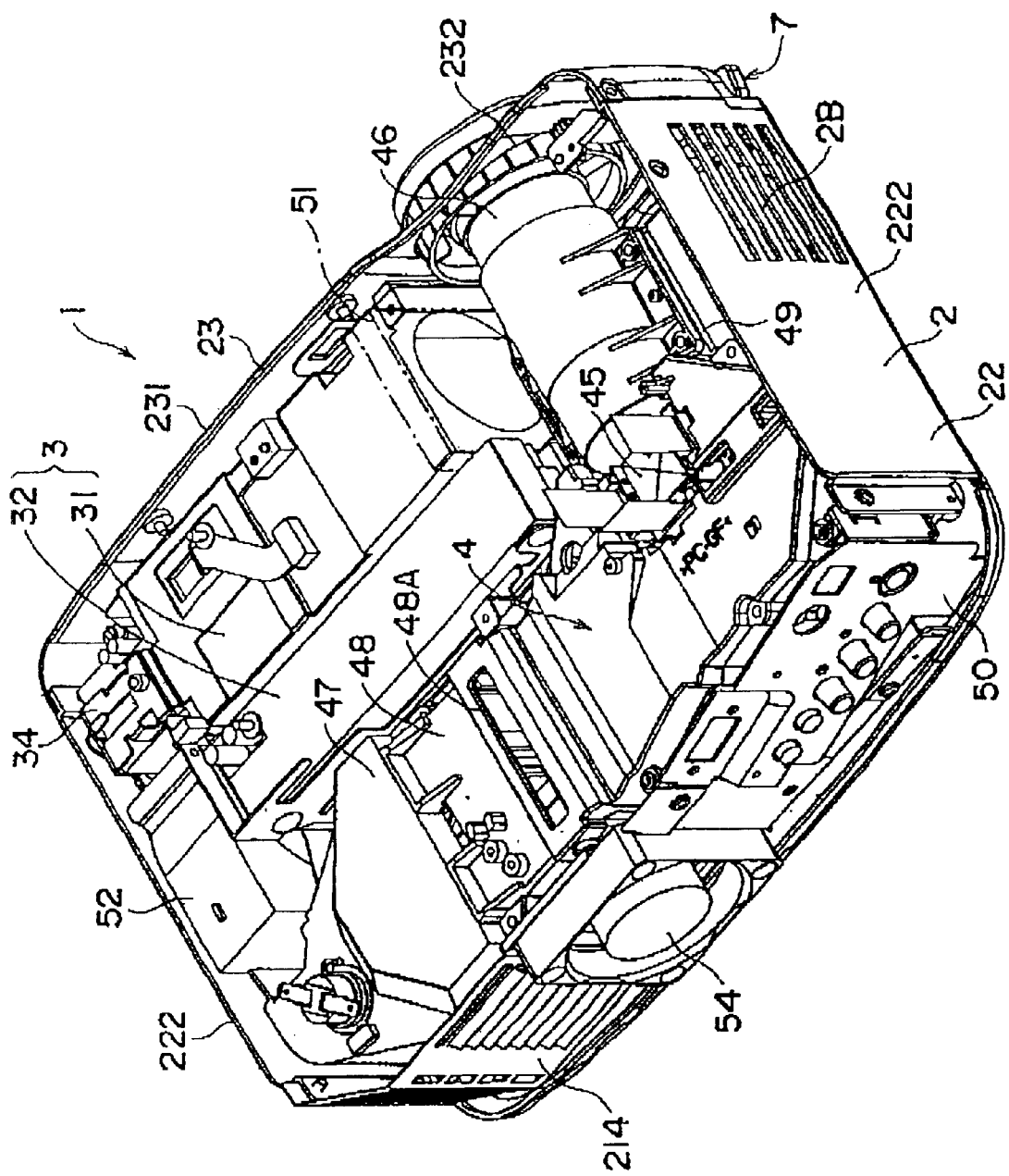
FIG. 3 is a perspective view of the projector showing the inside thereof.

In FIGS. 1 to 3, the projector 1 includes an outer case 2, a power-supply unit 3 accommodated within the outer case 2, and an optical unit 4 having an L-shaped plane and also being accommodated within the outer case 2.

Figure 4:
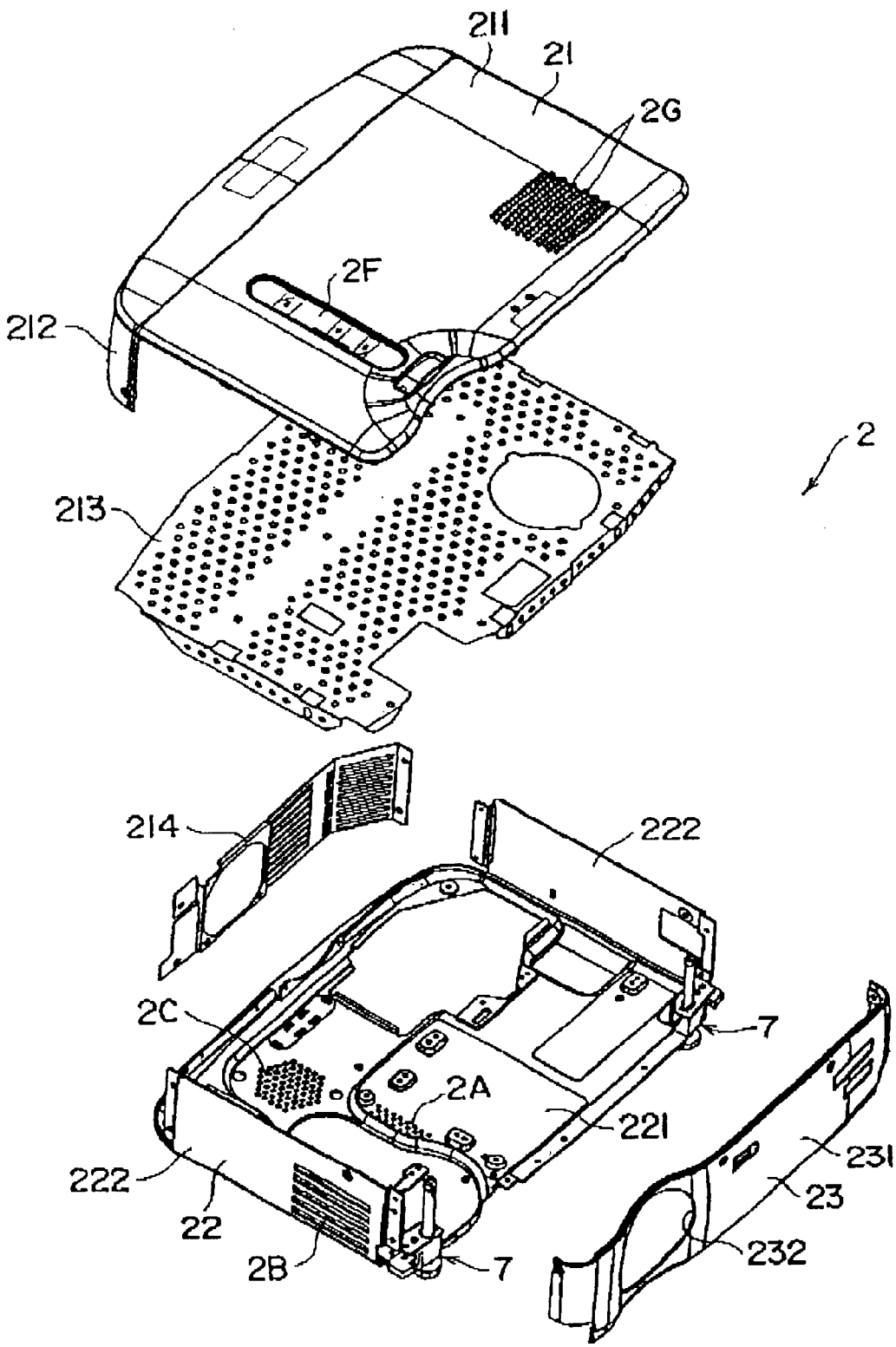
FIG. 4 is an exploded perspective view of an outer case according to the embodiment.

As is shown in FIG. 4, the outer case 2 includes an upper case 21 made from a synthetic resin, a lower case 22 made from a metal such as aluminum, and a front case 23 made also from a metal such as aluminum. These cases 21, 22, and 23 are connected to each other with screws.

The upper case 21 is integrally formed of a top face 211 and a back face 212.

Inside the top face 211, a porous first electromagnetically shielding member 213 made by punching an aluminum plate is detachably arranged. Inside the back face 212 of the upper case 21, a second electromagnetically shielding member 214 made from an aluminum plate is also arranged. The second electromagnetically shielding member 214 is connected to the lower case 22 with screws.

The lower case 22 is integrally formed of a bottom face 221 and a pair of side faces 222 opposing each other. The bottom face 221 and the side faces 222 are bent to each other by bending an aluminum plate, etc., formed by a press, a machining center, and so forth to have a predetermined shape.

Both front corners of the bottom face 221 are provided with height-adjustment mechanisms 7 that adjust the inclination of the entire projector 1 so as to align the projected image position. On the other hand, in the center on the rear side of the bottom face 221, a foot member 6 (FIG. 2) made from a resin is solely fitted therein.

The front case 23 is a member that forms a front face 231 of the outer case 2 and is also made by bending or drawing an aluminum plate, etc., formed by a press, a machining center, and so forth to have a predetermined shape. The front case 23 is provided with a circular opening 232 formed therein corresponding to a projection lens 46. The periphery of the circular opening 232 is curved inwardly by drawing.

In the outer case 2, there are provided air-inlets 2A, 2B, and 2C that receive cooling air inwardly, air-outlets 2D and 2E that exhaust cooling air from the inside, an operating panel 2F, and further a number of holes 2G formed corresponding to the position of a speaker. On the rear face of the outer case 2, various connectors for interfacing are exposed. A driver board, on which the connectors are mounted, and other boards are supported by an aluminum plate 50 fixed so as to plug an opening portion of the rear face. The aluminum plate 50 also serves as an electromagnetic shielding board.

The power-supply unit 3 includes a main power-supply 31 arranged in the front face side within the outer case 2 (FIG. 3) and a ballast 32 arranged in the rear of the main power-supply 31. The main power-supply 31 supplies electric power received through a power cable to the ballast 32 and a driver board (electronic circuit board, not shown), etc., and includes an inlet connector 33 (FIG. 2) into which the power cable is inserted, an aluminum frame 34 surrounding the periphery, and a power circuit (not shown).

The ballast 32 mainly supplies electric power to a light-source lamp (will be described later) of the optical unit 4 and includes a lamp driving circuit.

Figure 5:
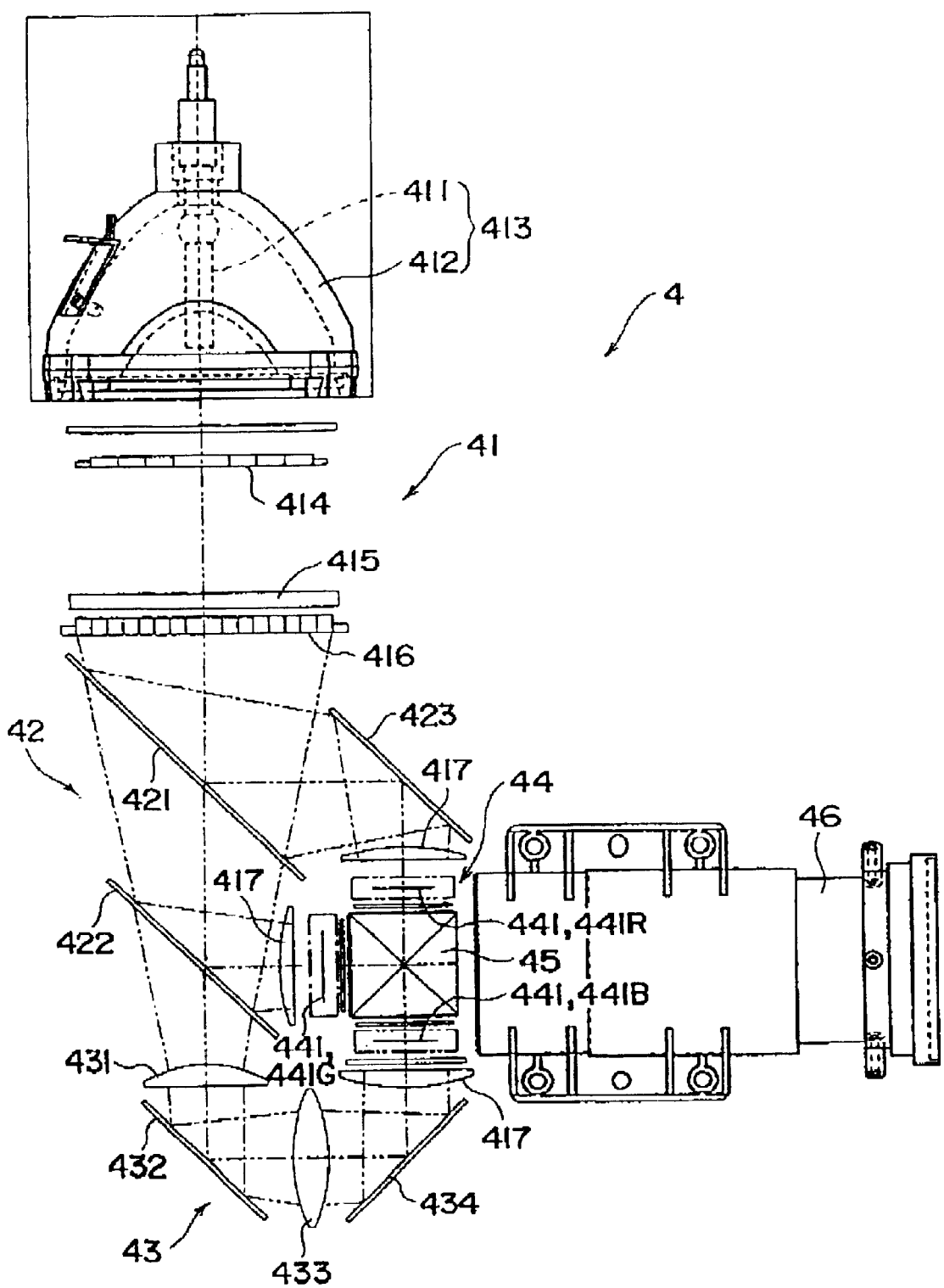
FIG. 5 is a plan view schematically showing each optical system of the projector.

As is shown in FIG. 5, the optical unit 4 includes an integrator-illumination optical system 41, a color-separation optical system 42, a relay optical system 43, an electro-optical device 44, a cross-dichroic prism 45 as a color synthesizing optical system, and a projection lens 46 as a projection optical system.

[2. Detail Structure of Optical System]

In FIG. 5, the integrator-illumination optical system 41 includes a light-source device 413 including a light-source lamp 411 and a reflector 412, a first lens array 414, a polarization-converting element 415, and a second lens array 416. Luminous flux emitted from the light-source lamp 411 is reflected by the reflector 412 so as to focus at a focal point; then, it is divided into plural parts of luminous flux by the first lens array 414 arranged on the way to the focal point so as to be converted into one kind of polarized light by the polarization-converting element 415; and then it enters into the second lens array 416. Such a polarization-converting element 415 is disclosed in Japanese Unexamined Patent Application Publication No. 8-304739, for example.

Each part of luminous flux converted into the one kind of polarized light by the polarization-converting element 415 focuses on a condenser lens 417, and finally, it is substantially superimposed on liquid crystal panels 441 (liquid crystal panels 441R, 441G, and 441B, for each color) as three optical modulators (light valves) forming the electro-optical device 44.

The color-separation optical system 42 includes two dichroic mirrors 421 and 422 and a reflecting mirror 423, and has a function of dividing plural parts of luminous flux emitted from the integrator-illumination optical system 41 into three light colors red, green, and blue by the dichroic mirrors 421 and 422.

The relay optical system 43 includes an incident-side lens 431, a relay lens 433, and reflecting mirrors 432 and 434, and has a function of introducing each light color separated by the color-separation optical system 42 to the liquid crystal panel. For example, blue light color is introduced to the liquid crystal panel 441B.

The electro-optical device 44 includes liquid crystal panels 441R, 441G, and 441B as three optical modulators. These panels are formed by using a poly-silicon TFT as a switching element, for example. Each light color separated by the color-separation optical system 42 is modulated by each of the three liquid crystal panels 441R, 441G, and 441B according to image information so as to form an optical image.

The cross-dichroic prism 45 forms images which are emitted from the three liquid crystal panels 441R, 441G, and 441B and modulated every each color so as to form a color image. In addition, in the cross-dichroic prism 45, a dielectric multi-layer film that reflects a red light beam and a dielectric multi-layer film that reflects a blue light beam are formed along the four surfaces of the right-angle prism to have a substantially X-shape. Three light colors are formed by these dielectric multi-layer films. The color image formed in the cross-dichroic prism 45 is emitted from the projection lens 46 so as to be magnified and projected on a screen.

Figure 6:
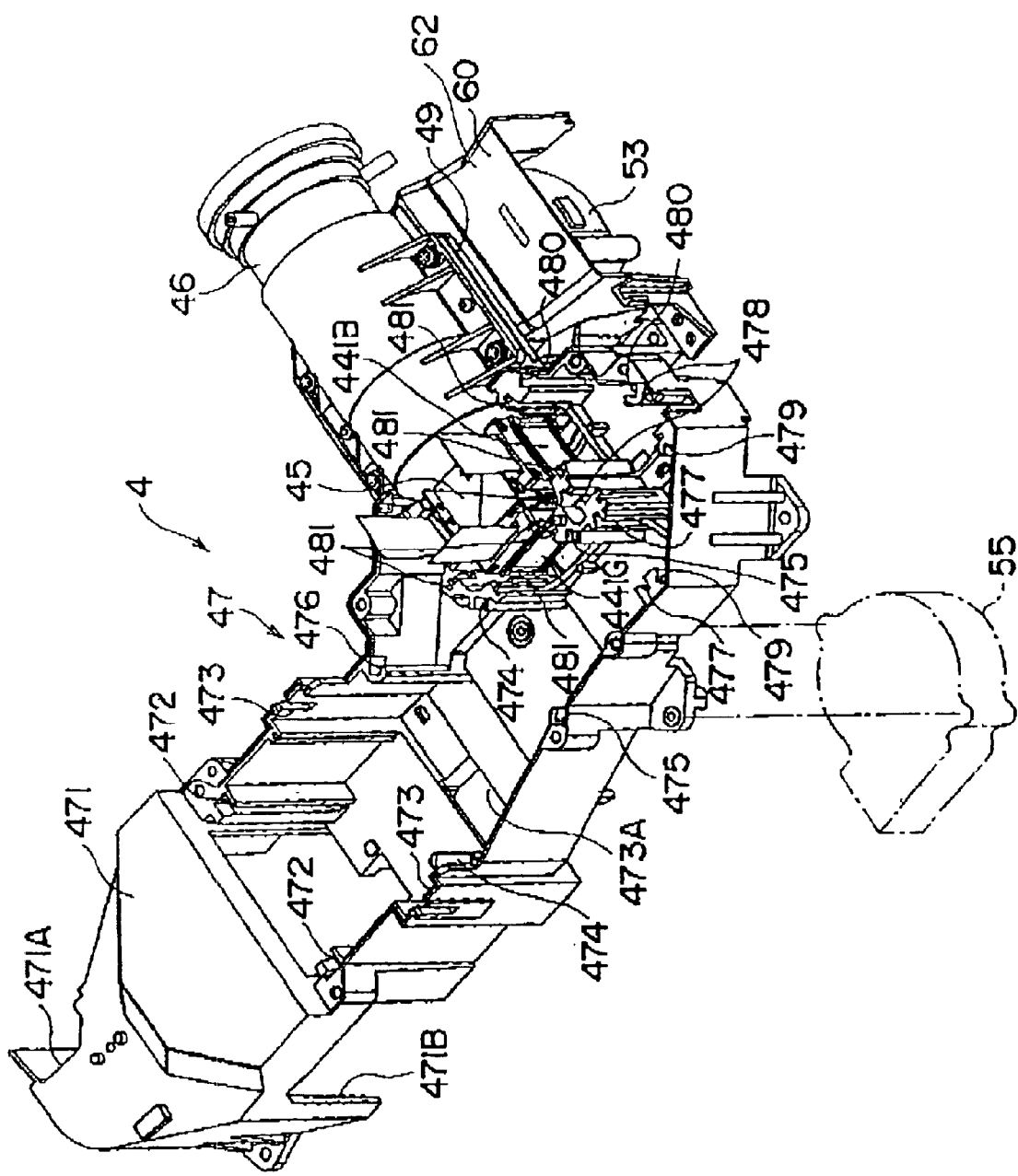
FIG. 6 is a perspective view of an optical unit of the projector showing members forming the optical unit.

The optical systems 41 to 45 described above are accommodated within a light guide 47 made from a synthetic resin and shown in FIG. 6. That is, the light guide 47 is provided with grooves 472 to 481, into which the above-mentioned optical parts 414 to 416, 421 to 423, 431 to 434 are slidingly fitted from the upper part, as well as a light-source protector 471 that covers the light-source device 413. The polarization-converting element 415 and the second lens array 416 are fitted into the groove 473, both of which are integrated into one piece. Then, a cover 48 shown in FIG. 3 is attached to the light guide 47.

The light guide 47 is also provided with a head section 49 formed in the light emitting side thereof. At one end of the head section 49, the cross-dichroic prism 45 having the liquid crystal panels 441R, 441G, and 441B attached thereto is fixed, and the projection lens 46 is fixed on a flange along a semi-cylindrical portion at the other end.

[3. Cooling Structure]

In FIGS. 1 to 3, within the projector 1, there are provided a first cooling system A in which the cooling air received from the side of the projection lens 46 and an air-inlet 2A formed on the bottom of the outer case 2 is exhausted from an air-outlet 2D, a second cooling system B in which the cooling air received from an air-inlet 2B formed on the side of the outer case 2 is exhausted from an air-outlet 2E, and a third cooling system C in which the cooling air received from an air-inlet 2C formed on the bottom of the outer case 2 is exhausted from the air-outlet 2E.

In the first cooling system A, an axial-flow receiving fan 51 (shown by the alternate long and short dash lines in FIG. 3) is arranged in the side of the main power-supply 31 toward the projection lens 46 while a first sirocco fan 52 is arranged in the side of the ballast 32 toward the light-source device 413.

By driving the axial-flow receiving fan 51, the cooling air received from the side of the projection lens 46 and the air-inlet 2A is further received by the first sirocco fan 52 after cooling the main power-supply 31. By the inhalation of the first sirocco fan 52, part of the cooling air from the air-inlet 2A flows toward the sirocco fan 52 so as to be received therein while cooling the ballast 32. The cooling air exhausted from the first sirocco fan 52 enters inside the light-source protector 471 from a cut-out for receiving 471A (FIG. 6) formed in the light guide 47 so as to cool the light-source device 413 from the rear; then, it is exhausted from a cut-out for exhausting 471B (FIG. 6) so as to be finally exhausted outside the outer case 2 from the outlet 2D.

Figure 7:
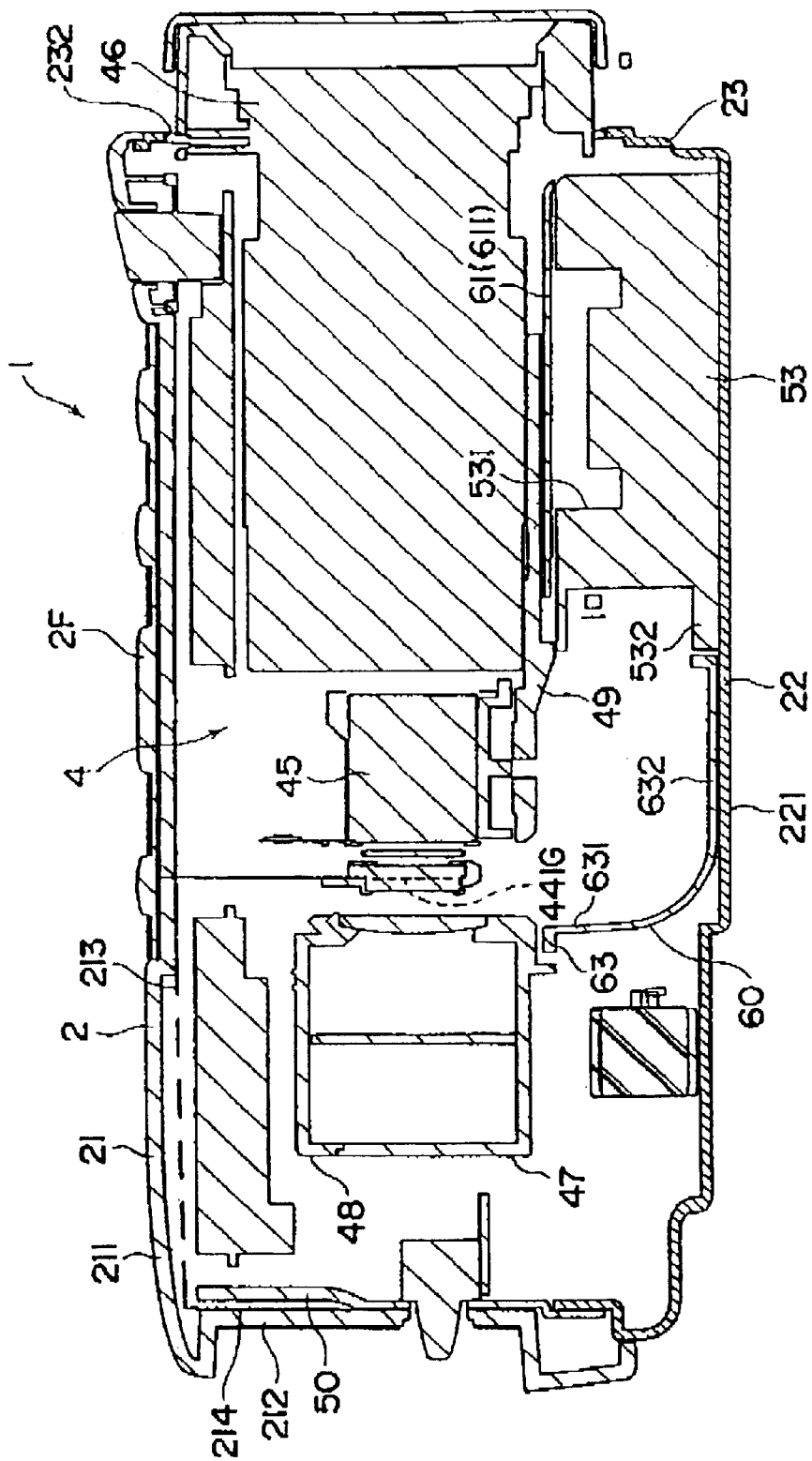
FIG. 7 is a longitudinal sectional view viewed in the direction of the arrows VII—VII in FIG. 1.
Figure 8:
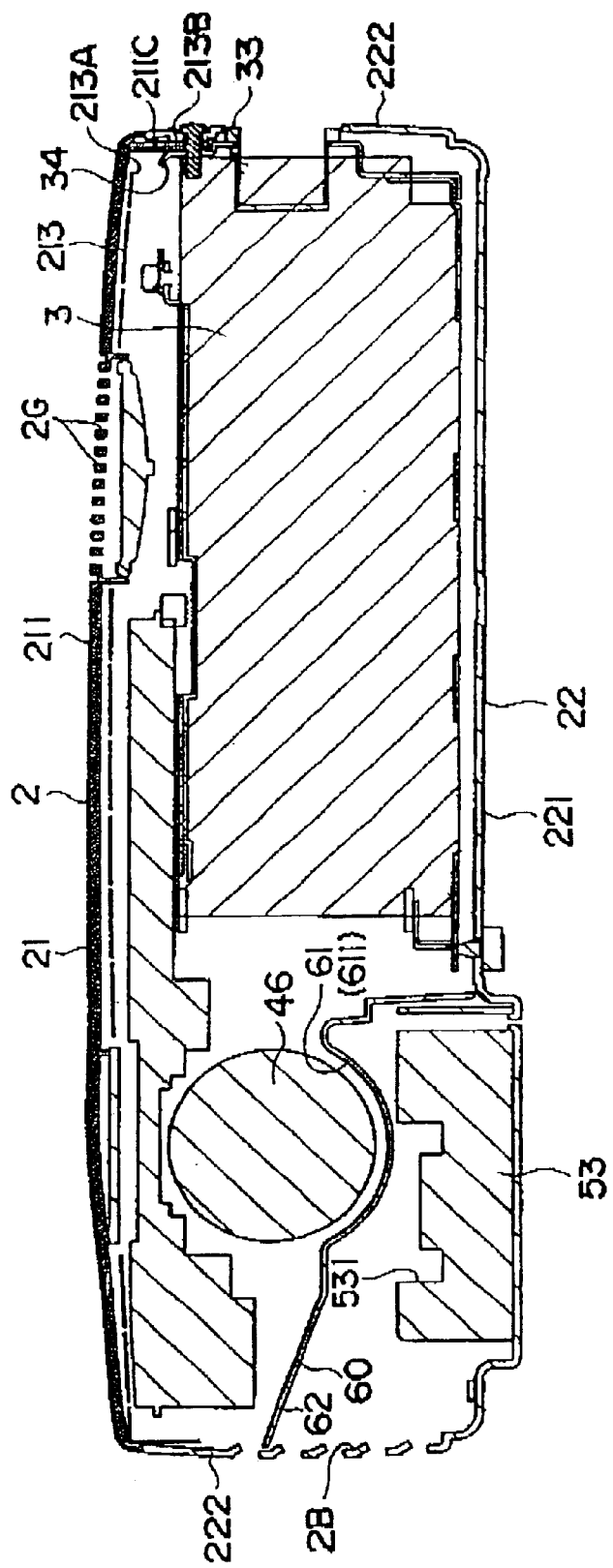
FIG. 8 is a longitudinal sectional view viewed in the direction of the arrows VIII—VIII in FIG. 1.

In the second cooling system B, as shown in the sectional views of FIGS. 7 and 8, a second sirocco fan 53 is arranged underneath the projection lens 46. The second sirocco fan 53 is placed in the intermediate portion within a duct member 60 (FIG. 6) that introduces cooling air from the air-inlet 2B toward the lower part of the electro-optical device 44.

The air received from the air-inlet 2B is introduced into the duct member 60 so as to be received by the second sirocco fan 53; then, it cools the electro-optical device 44 after being exhausted along the bottom surface of the outer case 2. Subsequently, the cooling air proceeds toward an axial-flow exhaust fan 54 in the backside so as to be exhausted through the air-outlet 2E by the exhaust fan 54 while cooling the driver board (not shown) arranged above the optical unit 4.

In addition, the second cooling system B will be described in detail later.

In the third cooling system C, as shown by the alternate long and short dash lines in FIG. 6, a third sirocco fan 55 is arranged at the position on the bottom surface of light guide 47 corresponding to that of the air-inlet 2C (FIGS. 2 and 4) on the bottom face of the outer case 2. The air-inlet 2C has individual holes with diameters that are as small as possible, thereby making it difficult for dust on the set-up place of the projector 1 to be sucked into the projector.

The cooling air received into the third sirocco fan 55 from the air-inlet 2C is exhausted toward the light-source device 413 via a duct-like section formed between the bottom surface of outer case 2 and the lower surface of the light guide 47; then, it is introduced into an opening for receiving 473A (FIG. 6) which is formed at a position in the light guide 47 corresponding to the groove 473 so as to cool the above-mentioned unit (unit including the polarization-converting element 415 and the second lens array 416) which is placed in the groove 473 from a lower part toward an upper part; then, the cooling air is exhausted from an opening for exhaust 48A (FIG. 3) of the cover 48; and it is finally exhausted from the air-outlet 2E by the axial-flow exhaust fan 54 in the backside.

[4. Detailed Structure of Second Cooling System]

In FIGS. 7 to 10, the second sirocco fan 53 disposed underneath the projection lens 46 is arranged such that an air-inlet 531 of the second sirocco fan 53 opposes the peripheral face of the projection lens 46 and an air-outlet 532 thereof faces the rear of the projection lens 46, and is fixed to the bottom face 221 of the lower case 22 with screws from an upper part.

Figure 10:
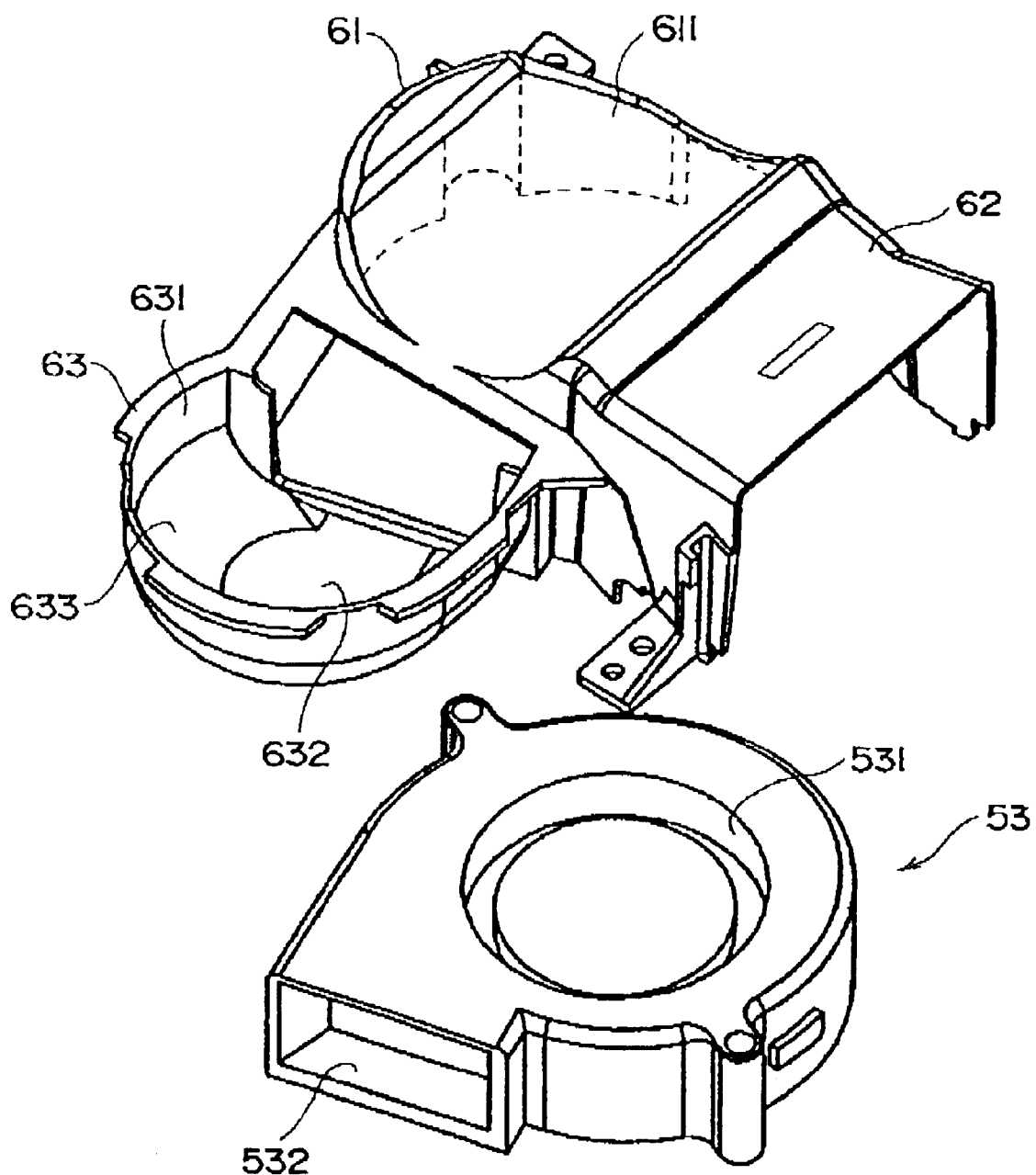
FIG. 10 is an exploded perspective view showing a sirocco fan and a duct member in the cooling system.
Figure 11:
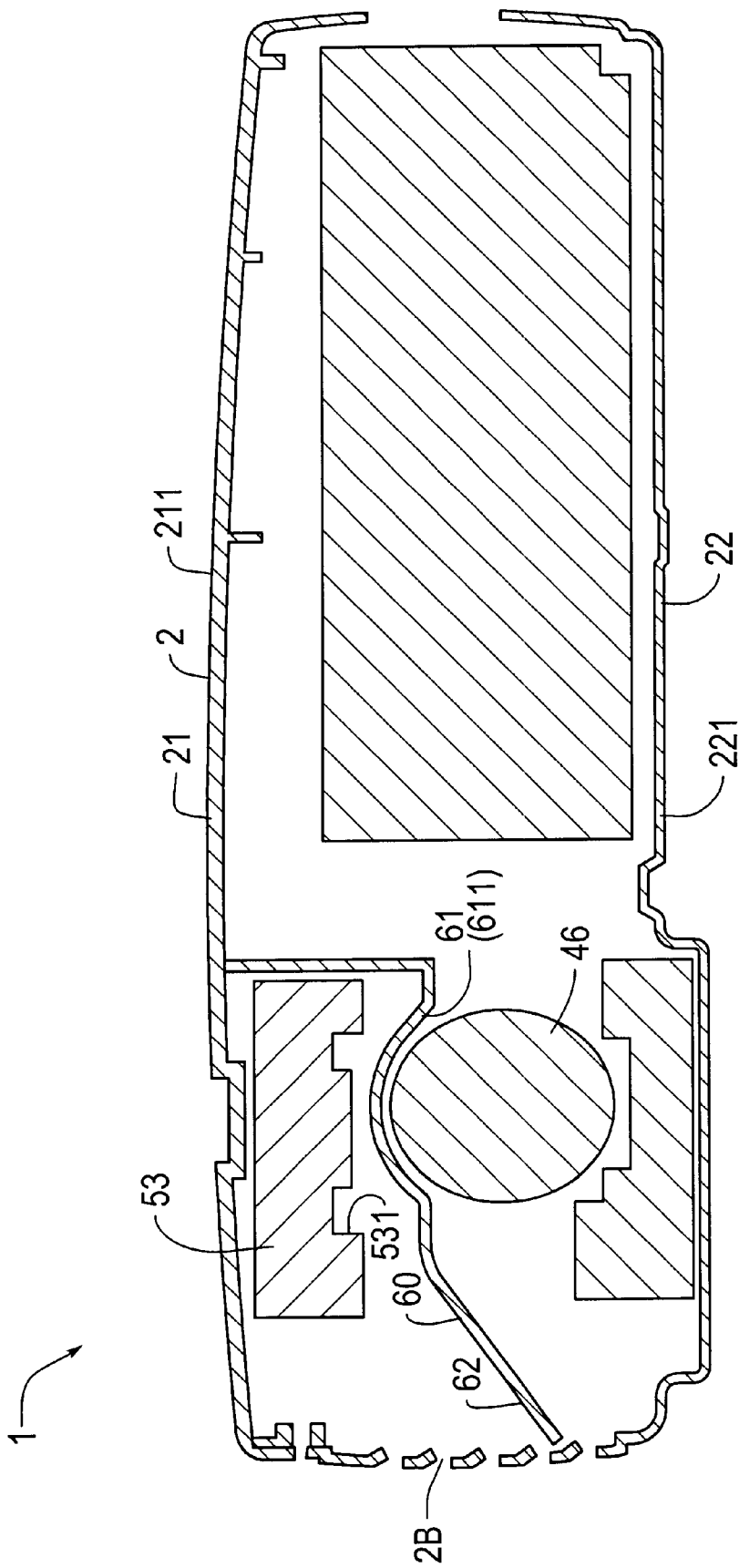
FIG. 11 is a longitudinal sectional view viewed in the direction of the arrows VIII—VIII in FIG. 1 illustrating another embodiment where the second sirocco fan is arranged in an upper part of the projection lens.

As shown in FIG. 10, the duct member 60 made from a synthetic resin includes an accommodating section 61 that accommodates the second sirocco fan 53, a receiving side duct 62 extending toward the air-inlet 2B of the lower case 22 from the accommodating section 61, and an exhaust side duct 63 extending toward the electro-optical device 44 from the accommodating section 61, which are integrally formed to have a substantially L-plane-shape.

The upper surface of the accommodating section 61 is a recess 611 having a curved surface parallel with the peripheral face of the projection lens 46. When the recess 611 is adjacent to and opposes the projection lens 46, a space on the air-inlet 531 of the second sirocco fan 53 can be securely maintained.

The receiving side duct 62 having a ⊃-shaped opening expanding and opening toward the air-inlet 2B introduces the cooling air flowed-in from the air-inlet 2B to the air-inlet 531 of the second sirocco fan 53.

The exhaust side duct 63 having an upwardly opened bowl-shape is formed of a vertical face 631 which is continuous in the peripheral direction in the upper side, a bottom portion 632, and a smooth curved face 633 continuously connecting between the vertical face 631 and the bottom portion 632, and the curved face 633 serves as a direction-bending section. That is, the cooling air exhausted from the air-outlet 532 of the second sirocco fan 53 in the horizontal direction is caused to flow in the vertical direction along the curved face 633 so as to cool the liquid crystal panels 441R, 441G, and 441B in the electro-optical device 44 upwardly from the lower part.

Figure 9:
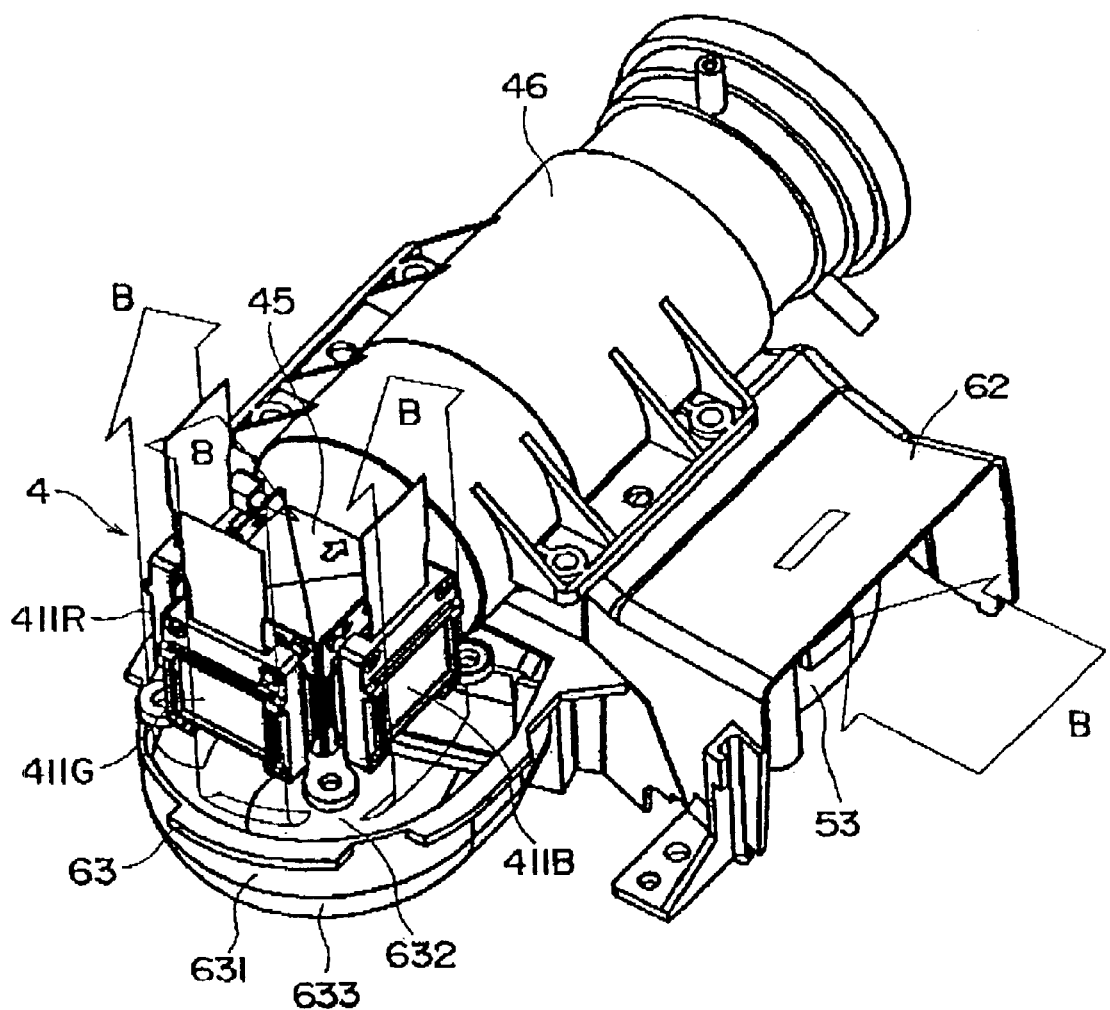
FIG. 9 is a perspective view showing a cooling system according to the embodiment.

At this time, as is shown in FIGS. 7 and 9, a clearance is created between the liquid crystal panels 441R, 441G, and 441B and the cross-dichroic prism 45, so that the cooling air flows through the clearance upwardly from the lower part, enabling the liquid crystal panels 441R, 441G, and 441B to be cooled from both sides.

[5. Effect of the Embodiment]

(1) In the second cooling system B according to the embodiment, since the second sirocco fan 53 with the air-inlet 531 opposing the projection lens 46 is used as a receiving fan, and the air-inlet 2B is also formed on the side face 222 of the lower case 22, it is not necessary to provide any air-inlet on the bottom face 221 or the top face 211 of the outer case 2. Therefore, dust on the set-up place of the projector 1 is prevented from being sucked into the projector, and it is difficult for dust to stick to the periphery of the air-inlet 2B, enabling the projector to be dust-proof without any filter on the air-inlet 2B. Even when a filter is attached thereto, it is difficult for dust to stick to the periphery of the air-inlet, enabling the number of replacements of the filter to be reduced. Under certain circumstances, the replacement of the filter can be eliminated. If so, the replacement structure of the filter is not required.

When the filter or the replacement structure of the filter is not required, the number of parts is reduced, and the structure around the air-inlet 2B can also be simplified, thereby reducing the manufacturing cost.

Since the air-inlet is formed on the side face of the outer case and the air-inlet of the sirocco fan opposes the projection lens, the air-flow resistance following air receiving can be reduced, facilitating miniaturization of the apparatus.

Furthermore, the second sirocco fan 53 is placed by utilizing a space under the projection lens 46, which is liable to be a dead space, enabling the arrangement space to be efficiently used and the degree of freedom of a layout design for other internal elements to be increased, thereby promoting miniaturization of the projector 1.

(2) Since the duct member 60 is provided with the receiving side duct 62 for introducing cooling air from the air-inlet 2B to the air-inlet 531 of the second sirocco fan 53, the cooling air can efficiently flow into the air-inlet 531 of the second sirocco fan 53, thereby enhancing the efficiency for cooling the liquid crystal panels 441R, 441G, and 441B.

(3) Since the duct member 60 is also provided with the exhaust side duct 63 for introducing cooling air from the air-outlet 532 of the second sirocco fan 53 to a lower part of the liquid crystal panels 441R, 441G, and 441B, the cooling air can be securely sent without omission to the liquid crystal panels 441R, 441G, and 441B from the air-outlet 532 of the second sirocco fan 53, enabling the cooling efficiency to be further enhanced.

(4) Since in the duct member 60, the receiving side duct 62 and the exhaust side duct 63 are integrally formed with each other, handling thereof is enhanced compared with handling when these elements are individually formed, enabling the assembling to the lower case 22 to be easier.

(5) Since the exhaust side duct 63 of the duct member 60 is provided with the curved face 633 for vertically bending the air-flow direction of the cooling air exhausted from the second sirocco fan 53, the air-flow direction of the cooling air can be securely bent from a lower part upwardly, enabling the liquid crystal panels 441R, 441G, and 441B to be further sufficiently cooled.

(6) Since the smooth curved face 633 can bend the air-flow direction of the cooling air, the cooling air can flow smoothly, thereby suppressing the generation of a turbulent current and noises in the duct member 60.

(7) Since the top face of the accommodating section 61 of the duct member 60 is the recess 611 having a curved surface, which is adjacent to and opposes the peripheral face of the projection lens 46, a space on the air-inlet 531 of the second sirocco fan 53 can be maximized as an internal space of the duct member 60, and the cooling air can be smoothly sent to the air-inlet 531.

(8) Since in the first to third cooling systems A to C, the sirocco fans 52, 53, and 55 are used to receive cooling air, noises due to the rotation of the fan can be remarkably reduced in comparison with those when using an axial-flow fan instead of the sirocco fan.

[6. Modifications]

In addition, the present invention is not limited to the embodiment described above; however, it can contain other structures capable of achieving the object of the present invention, and the present invention includes modifications which will be described below.

For example, in the second cooling system B according to the embodiment, the upper surface of the accommodating section 61 in the duct member 60 is the recess 611 having a curved surface corresponding to the peripheral face of the projection lens 46; however, the upper surface may be a simple planar surface.

In the exhaust side duct 63 of the duct member 60, the direction-bending section is formed by the curved face 633; however, the direction-bending section may be formed by arranging only the vertical face 631, for example. However, the direction-bending section formed by the curved face 633 has an advantage of the smooth flowing of the cooling air.

In addition, the configuration of the direction-bending section is not limited to the configuration described above. When the cooling air-flow is guided in an arbitrary direction by dividing it into several portions using a dividing guide plate, etc., the direction-bending section may be formed by such a dividing guide plate.

In the duct member 60, the receiving side duct 62 and the exhaust side duct 63 are integrally formed with each other; however, the receiving side duct and the exhaust side duct may be separately formed with each other. In such a case, a member corresponding to the accommodating section 61 according to the embodiment may be omitted by extending a member in the receiving side toward the vicinity of the air-inlet of the sirocco fan, for example.

In addition, the duct is not an essential part of the present invention, and structures without ducts in the receiving side and the exhaust side are also included in the present invention.

The second sirocco fan 53 is arranged underneath the projection lens 46; however, a sirocco fan according to the present invention may be arranged in an upper part of the projection lens so that an air-inlet of the sirocco fan faces downwardly so as to oppose the projection lens.

In the third cooling system C according to the embodiment, the third sirocco fan 55 that receives the cooling air from the air-inlet 2C is used; however, part of the cooling air in the second cooling system B may be sent toward the front face of the light-source device 413 after passing through between the lower case 22 and the light guide 47, for example. Thereby, the air-inlet 2C formed on the bottom face 221 can be eliminated so that the sucking of dust can be prevented more securely.

In the air-inlet 2B disposed on the side of the outer case 2 according to the embodiment, a filter may be provided. The arrangement of such a filter enables the dust-proof function to be further enhanced. The replacement structure for replacing such a filter may also be provided.

In the embodiment described above, the projector having three optical modulators is only described as an example; however, the present invention can be applied to a projector using only one optical modulator, a projector using two optical modulators, or a projector using four optical modulators or more.

In the embodiment, the liquid crystal panel is used as an optical modulator; an optical modulator except the liquid crystal panel such as a device using a micro-mirror may be used. Also, in the embodiment, the transmission-type optical modulator having a plane of light-incidence and a plane of light-emergence both of which are different from each other is used; however, a reflecting-type optical modulator having a plane of light-incidence and a plane of light-emergence both of which are identical to each other may be used. Furthermore, in the embodiment, the front-type projector in which projection is performed from the direction viewing a screen is only described as an example; the present invention can also be applied to a rear-type projector in which the projection is performed from the direction opposite to that viewing a screen.

As described above, according to the present invention, since a sirocco fan with an air-inlet opposing a projection lens is used as a receiving fan, and an air-inlet for receiving cooling air from the outside is formed on a side face of an outer case, it is not necessary to provide any air-inlet on the bottom face or the top face of the outer case. Therefore, dust on a set-up place of a projector may be prevented from being sucked into the projector, and it becomes difficult for dust to stick to the periphery of the air-inlet, enabling the projector to be dust-proof without any filter on the air-inlet. Even when a filter is attached thereto, it is difficult for dust to stick to the periphery of the air-inlet, enabling the number of replacements of the filter to be reduced. Under certain circumstances, the replacement of the filter can be eliminated. If so, the replacement structure of the filter is not required.

When the filter or the replacement structure of the filter is not required, the number of parts is reduced and the structure around the air-inlet can also be simplified, thereby reducing the manufacturing cost. Since the air-inlet is formed on the side face of the outer case and the air-inlet of the sirocco fan opposes the projection lens, the air-flow resistance following air receiving can be reduced facilitating miniaturization of the apparatus. Furthermore, the sirocco fan is placed by utilizing a space in an upper part or a lower part of the projection lens, which is liable to be a dead space, enabling the arrangement space to be efficiently used and the degree of freedom of a layout design for other internal elements to be increased, thereby promoting miniaturization of the projector.

What is claimed is:

1. A projector, comprising:

a light source;

a projection lens having an upper part and a lower part, luminous flux emitted from the light source being magnified and projected by the projection lens so as to form a projected image after being modulated;

an outer case having a side that defines an air-inlet that receives cooling air, the air-inlet being disposed beside the projection lens; and a sirocco fan that receives air disposed at one of the upper part and the lower part of the projection lens, the sirocco fan defining an air-inlet that opposes the projection lens.

2. The projector according to claim 1, further comprising a duct disposed at a receiving side arranged between the air-inlet defined by the side of the outer case and the air-inlet of the sirocco fan.

3. The projector according to claim 1, further comprising:

an optical modulator that modulates the luminous flux; and a duct disposed at an exhaust side arranged between an air-outlet of the sirocco fan and one of an upper part and a lower part of the optical modulator.

4. The projector according to claim 1, further comprising:

a duct disposed at a receiving side arranged between the air-inlet defined by the side of the outer case and the air-inlet of the sirocco fan;

an optical modulator that modulates the luminous flux; and a duct disposed at an exhaust side arranged between an air-outlet of the sirocco fan and one of an upper part and a lower part of the optical modulator, the duct in the receiving side and the duct in the exhaust side being integrally formed with each other.

5. The projector according to claim 3, the duct in the exhaust side being provided with a direction-bending section formed therein to vertically bend a direction of the cooling air delivered from the sirocco fan.

6. The projector according to claim 5, the direction-bending section being formed to have a smooth curved shape.

7. The projector according to claim 2, the duct defining a recess which is adjacent to and opposes a peripheral surface of the projection lens.

* * * * *